Nov. 24, 1964 W. H. BRAND 3,157,994
CONTROL SYSTEM
Filed July 6, 1962 3 Sheets-Sheet 1

INVENTOR.
WARREN H. BRAND
BY
*Herman Foster*
ATTORNEY

United States Patent Office 3,157,994
Patented Nov. 24, 1964

3,157,994
CONTROL SYSTEM
Warren H. Brand, Blue Bell, Pa., assignor to Conoflow Corporation, Philadelphia, Pa., a corporation of Pennsylvania
Filed July 6, 1962, Ser. No. 207,943
19 Claims. (Cl. 60—52)

This invention relates generally to a control system for controlling the magnitude or state of a process condition such as flow, pressure, temperature or pH, etc. More particularly, it concerns apparatus for adjusting a final control element to regulate a condition varying medium within desired limits.

In Patent No. 2,616,448 to Rudolph B. Werey there is presented an improved control system for positioning a valve stem by a motor driven mechanical rotary motion device. In describing the mechanical device the patent sets out the need for a valve operator, ". . . which will combine the features of practically unlimited power, unlimited length of stroke, extreme accuracy of intermediate positioning and ease of adaptability to a variety of industrial control elements such as valves, louvers, dampers, etc."

The patent then continues in its recitation with the statement: "An additional feature is urgently required, namely, that the stem of the operator remains in its last position in case of sudden failure of the operating fluid, namely, the air supply. It is impractical to build this feature into presently available valve operators using static loading methods."

With but two exceptions, which are hereinafter described, the above quoted statements of need from the aforementioned patent are still true. The patentee, Werey, has contributed a device which in many special applications admirably fulfills those described needs. However, the fulfillment is by a device, which, when desired to be used in many general applications, practical experience and application has shown, is inherently comparatively very large and heavy, contains a large inertia factor in its mechanism, is relatively slow in its response, and has a very low efficiency rating.

One exception to the need set out in the above quoted statement is the requirement for unlimited length of stroke. Past experience has shown that most process conditions to be controlled will occur within a predictable range. Moreover, feedback limitations place practical restrictions on the permissible length of stroke. The second exception to the above quoted statements of need is particularly directed to that portion quoted above which points out the impracticability of holding the stem in its last position by valve operators which use static loading methods. That statement no longer is true as a result of the introduction of the present invention.

Generally speaking, one form of present invention may be a valve operator using static loading methods which in case of sudden failure of the air supply will retain the stem of the operator in its last position. Therefore, the present invention retains the advantages ascribed to the Werey device and in addition contains the following advantages over the Werey device or devices similarly constructed.

For a job of comparable requirements between the Werey device and the present invention the present preferred device is inherently small and light, does not have any requirement for any significant inertial consideration, and is more efficient (approximately 75% efficient versus 5% efficient for the motor driven arrangement shown in the Werey patent). In addition, the present invention permits adjustments and controlled changes in operation which, if desired in the Werey apparatus, would require a change of gears.

Further, the present invention may be considered to include the following desirable features attributed to the Werey device: There is, theoretically speaking, no limitation on the power supply for operating the valve. Overload protection is available in either direction. If there is a blocking of the drive in one direction due to actuation of a limit switch in the system the system may still drive in the opposite direction. Upon driving in the opposite direction the previously triggered limit switch resets itself to the next limiting operation at the same thrust equivalent.

As with the Werey device, auxiliary operation by hand may be effected with the addition of a simple auxiliary mechanism.

In general terms, the preferred form of this invention is a closed circuit power actuator which is actuated or initiated into operation by a variable input air pressure supplied by a control instrument signal in response to variations occurring in the process to be controlled. The apparatus includes a proportional position valve which is responsive to the variable input air pressure, and which is connected to an air motor. The air motor operates in either a forward or reverse direction depending on the setting of the pilot valve, and is connected through a shaft to a reversible positive displacement pump which is preferably a hydraulic gear pump. The gear pump is capable of moving oil or some other suitable liquid in either of two directions through a circuit connected to the opposite ends of a power cylinder. This oil or liquid operates on a piston within the cylinder, so as to move a final control element such as the stem of a valve.

Pilot check valves so constructed that oil can flow through them in one direction but not in the opposite direction unless opened by a pressure applied to a piloting piston are placed in the lines of the circuit. When one of the lines is pressurized and the other is not, fluid flows through at least one of the valves to move the aforementioned power piston while at least another such valve in the unpressurized line permits the return flow of fluid either to the suction side of the pump or into a sump. The sump is a source of supply of liquid for the gear pump.

Similar conditions apply when the hydraulic pump is operated in the reverse direction. When there is no pressure in either of the lines of the circuit, for example, should there be a stoppage of air pressure, the aforementioned check valves are locked closed to permit no flow, thereby locking the piston in its exact position within the cylinder.

In the preferred embodiment electric solenoids whose actuation is initiated by electric pressure limit switches are provided in addition to relief valves in order to protect the system against overload. When the piston in the cylinder reaches either end of its travel, liquid pressure in the cylinder and the feeder line of the aforementioned circuit, continues to build up until a predetermined pressure level (for example 4000 p.s.i.) is reached. At this point the limit switch in the appropriate line is tripped and, through the appropriate solenoid, shuts off the air to the motor. Should the liquid pressure continue to rise after the motor is shut off a relief valve set to open at a predetermined pressure (for example 4400 p.s.i.) will open permitting oil to circulate back to the sump or the suction side of the pump.

For a better understanding of the invention, its advantages and specific objectives, which may be obtained from its use, reference is to be had to the following description of a preferred embodiment of this invention taken in conjunction with the accompanying drawings in which.

Figure 1:
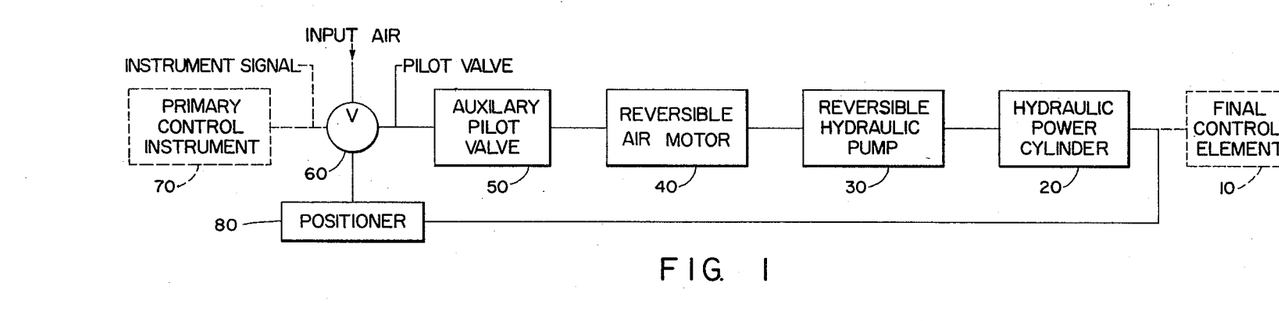
FIG. 1 is a block diagram showing the general relationship of the primary components of the present invention.
Figure 2:
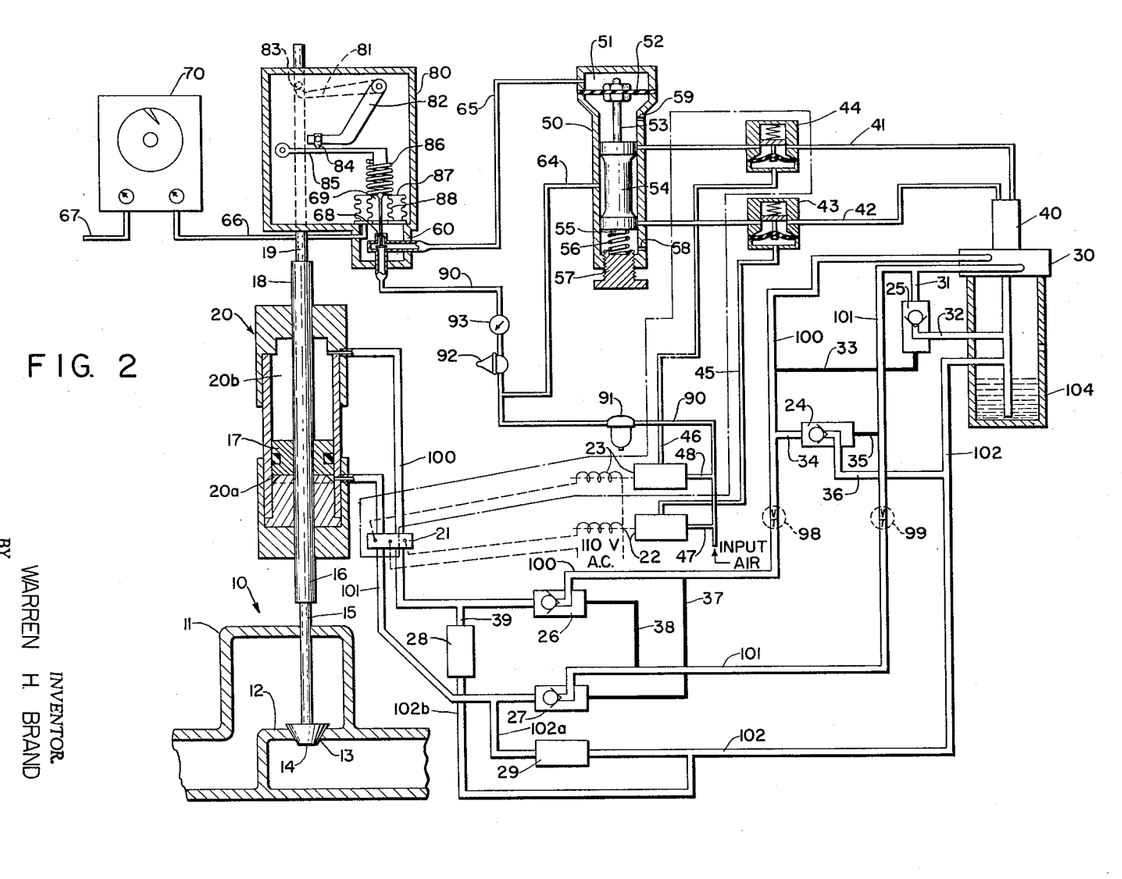
FIG. 2 is a diagrammatic view, partly in section, showing details of various of the components of the system.

Referring more particularly to the drawing, there is shown, in FIG. 1, the general relationship of the components of the present invention with respect to a final control element. The preferred embodiment of this invention is shown in FIG. 2 and also in FIG. 4 to be a control system for a final control element in the form of a valve 10. It is to be understood, however, that this showing is by way of example only and not of limitation and that the control system of the present invention may be modified within the scope of the appended claims and used with devices such as dampers, louvres, pumps, or other devices where control of a measurable amplitude is desired.

The final control element or valve 10 (as it is hereafter referred to) is shown in FIG. 1 and FIG. 2 as being powered by a hydraulic cylinder 20 which is supplied with liquid under pressure by a reversible hydraulic gear pump 30. This pump is preferably driven by a high speed, low inertia, reversible pneumatic motor 40. An auxiliary pilot valve 50 controls the air supply to the motor. The auxiliary valve is in turn controlled by air coming from a pilot valve 60 which is responsive to changes occurring in a conventional pneumatic control instrument 70 and/or a positioning relay 80.

The valve 10 may be of any desired type but for purposes of description is presented here as a piston type valve with its construction simplified. The valve is shown with a body 11 having a partition 12 through which is an opening 13. Fitted within the opening 13 is a movable plug 14 which is fastened to and supported by a valve stem 15. For purposes of description the valve is here shown in its closed position.

The stem 15 is joined to piston rod 16 which is fastened to a piston 17. In conjunction with the preferred embodiment of this invention the cylinder 20 is double ended. Thus, a rising stem 18 is fastened to the piston 17 and extends from the end of the cylinder opposite that through which rod 16 extends. This stem 18 is connected to positioning relay 80 by means of an extension 19 in a manner which is more specifically described elsewhere in the following description.

Connected into the upper portion of cylinder 20 is a hydraulic line 100 which is connected to a gear pump 30 to provide pressurized liquid to drive piston 17 downwardly. Connected into the lower portion of cylinder 20 is a hydraulic line 101 which is also connected to gear pump 30 to provide pressurized liquid to drive piston 17 upwardly when the gear pump is operated in its reverse direction. Both lines 100 and 101 are joined to the pump sump 104 by line 102.

In FIG. 2 both lines 100 and 101 pass through a pressure sensitive chamber 21 which contains electrical pressure limit switches of a well-known type such as those manufactured under the name Oil-Dyne. These switches are in turn connected to electrically controlled solenoid valves 22 and 23 whose operation is set out below in greater particularity.

Under particular conditions it may be desirable to have well-known electrical travel limit switches connected to the rod 16 or the stem 18 to actuate the solenoid valves 22 and 23 when the piston 17 is at a predetermined position. However, for purposes of preventing confusion as to the preferred embodiment the detailed description will be limited to the use of a pressure sensitive limiting device.

From the pressure limit switch the hydraulic lines 100 and 101 are connected through a hydraulic network to the reversible gear pump 30. This network is depicted as containing pilot check valves 24, 25, 26 and 27 and pressure relief valves 28 and 29. Cross connecting lines 31, 32, 33, 34, 35, 36, 37, 38, 39, 102a and 102b are also depicted as part of the network. It is to be understood that this network is merely a representation of a suitable network and that practical requirements may dictate other arrangements involving the use of multiple acting valves.

Figure 4:
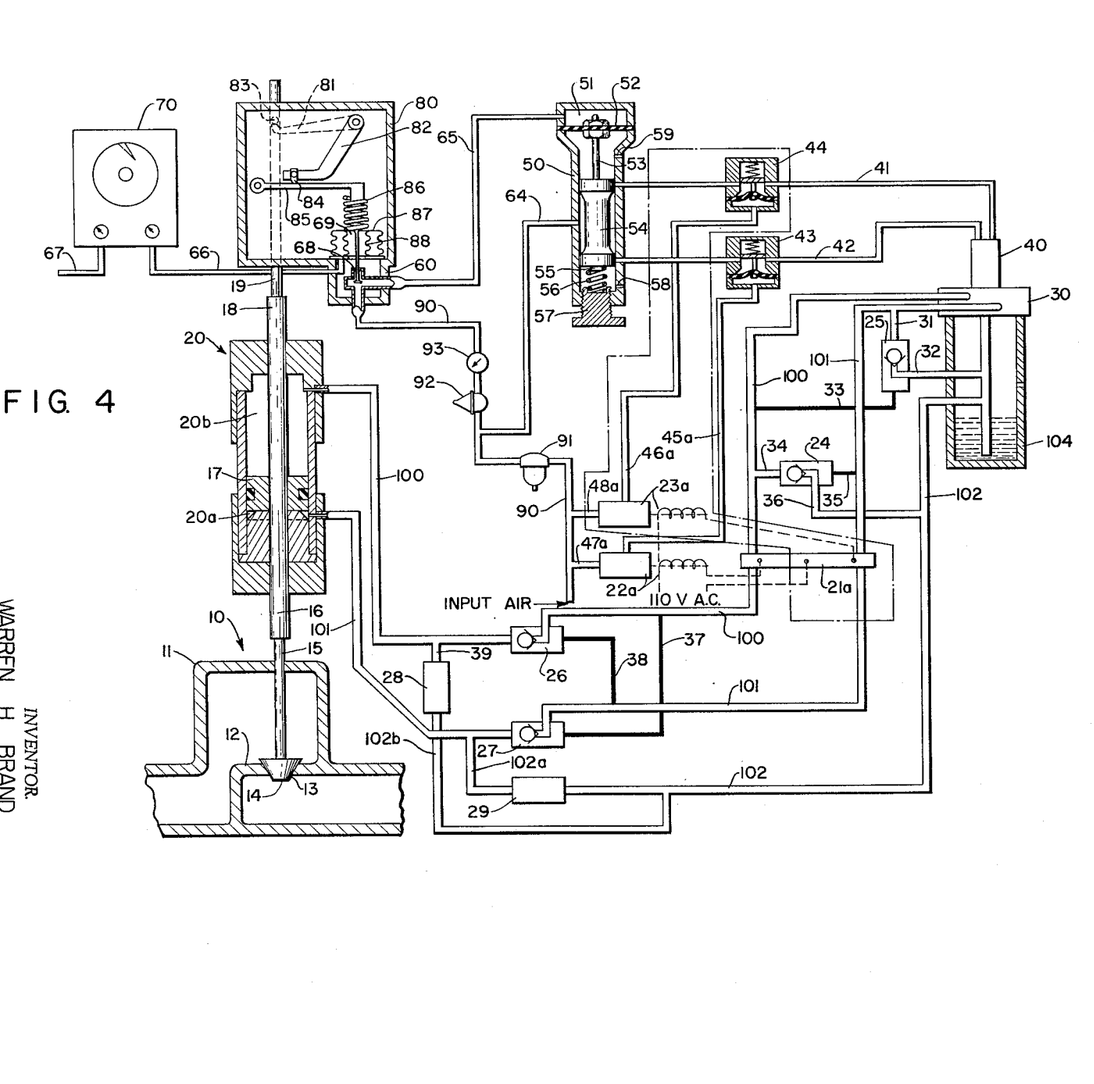
FIG. 4 is a view similar to FIG. 2 having a different arrangement of limit control.

It may, for example, be desirable, to have a system wherein the speed of travel of piston 17 may be controlled. This would easily be accomplished by placing variable needle valves in the network to control the flow of liquid through either one or both of lines 100 and 101. Such a possibility is indicated in dotted lines as throttle valves 98 and 99. In addition, the pressure sensitive chamber 21 might be located adjacent the gear pump rather than adjacent the cylinder, as shown in FIG. 4 by chamber 21a.

Motor 40 is preferably a high torque, low inertia, high speed, fluid-driven motor, of the multi-vane type. This type of motor is commercially obtainable, but if unavailable, other motors having the same characteristics may be used. The motor is driven by fluid, preferably air, admitted through one of pipes 41 or 42. These pipes are in turn connected to the auxiliary pilot valve 50. The motor contains a shaft (not shown) which is directly connected to the gear pump. Air entering the motor through pipe 41 will drive the motor, and therefore the pump, in one direction. Air entering the motor through pipe 42 will drive the motor and pump in the opposite direction.

Between the motor 40 and the auxiliary pilot valve 50 each line 41 and 42 contains a cutoff valve 44 and 43 respectively. These valves are pneumatically operated 3-port valves which preferably are normally closed when no pressure exists in the lines 45 and 46. This condition will occur when the valves 22 and 23 are actuated by excess pressure. Valve 43 is connected by an air line 45 to solenoid valve 22. Valve 44 is connected by an air line 46 to solenoid valve 23. This limiting arrangement of solenoid valves and air actuated 3-port valves is considered to be the most practical arrangement. However, it is possible to substitute an arrangement where electric actuation is not considered desirable. Such an arrangement is shown in FIG. 3.

Figure 3:
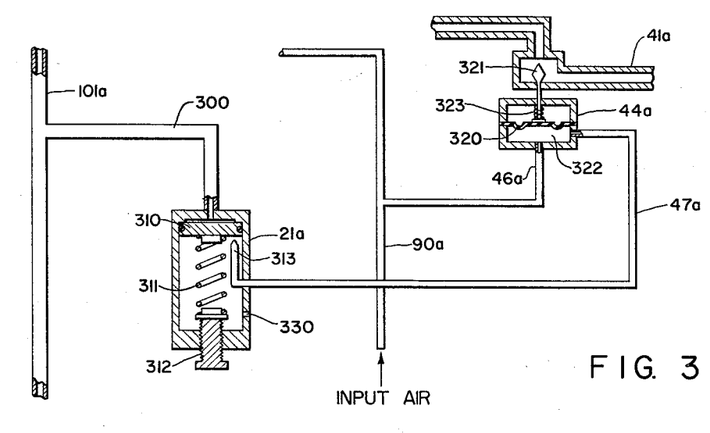
FIG. 3 is a diagrammatic view, showing a form of limit control which may be utilized in the portion of the system boxed in by dot-dash lines in FIG. 2.

To illustrate the similarity of the FIG. 3 arrangement with that of FIG. 2, many of the components have numerical designations similar to those of the corresponding components of FIG. 2 but with a subscript "a" added. Thus, 101a is a liquid containing line of a hydraulic network with a line 300 coming off it. Fastened to the end of line 300 is a spring loaded cutoff valve 21a containing a movable piston 310, a coil spring 311 and a spring adjustment screw 312. A line 41a is shown, which in the entire apparatus carries air to the pneumatic motor. This line contains a valve 44a which is schematically shown to have a diaphragm 320 and a valve closure member 321 fastened thereto. A pneumatic pressure supply line 46a connects this valve 44a with the air supply line 90a. An air bleeder line 47a is joined to the same diaphragm closed chamber 322 as the line 46a. At the other end of the line 47a is a valve jet 313 through which air constantly escapes. The amount of escaping air is limited by the jet size and the space between the jet 313 and the piston 310.

The system as shown in FIG. 3 is in equilibrium. With the spring 311 overcoming the force from line 300 the jet 313 is open and air entering chamber 322 from line 46a is free to escape via line 47a, jet 313 and an atmosphere port 330 in 21a. Thus, valve closure member 321 will remain open due to the pressure of spring 323 and the line fluid pressure in 41a. Should the pressure in 101a reach the limit previously selected, beyond which operation of the system is undesirable, this pressure buildup will force piston 310 down against the posing force of the spring, thus closing the jet 313.

With the air bleed discontinued pressure in chamber 322 will soon equal that of line 90a thus forcing the diaphragm 320 and closure member 321 to shut down line 41a. Since air is no longer being supplied through line 41a the motor 40 will shut off.

An arrangement similar to that of FIG. 2 may be used for the portion of FIG. 4 boxed in by the dot-dash line. Because of such an obvious similarity it has not been considered necessary to show such an arrangement in the drawing.

Referring again to FIG 2, the auxiliary pilot valve 50 receives relay signal air through a conduit 65 from the pilot valve 60. This air enters a chamber 51 to impinge on a diaphragm 52. A rod 53 carries a piston member 54 which controls the flow of air from supply line 64 to either line 41 or line 42. The lower end of the piston has an abutment 55 which is fitted within a compression spring 56. The lower end of the spring rests in an adjustable cradle, 57.

The spring 56 constantly biases the diaphgram 52 upwardly against the force exerted by the air pressure in chamber 51 to a degree determined by the setting of cradle 57.

When the diaphragm 52 is moved downwardly in response to air entering from line 65, the piston 54, is also moved downwardly uncovering the entrance to pipe 42 and thus permitting flow from line 64 to pipe 42. Conversely, when the piston 54 is moved upwardly by the spring 56 against the force of the diaphragm 52, the entrance to pipe 41 is uncovered permitting flow from line 64 to pipe 41.

Which way the diaphragm 52 will move is determined by the air pressure in line 65. The air pressure is controlled by the pilot valve 60 which operates in response to a follow-up type of amplifying device or positioning relay 80. The operation of both the pilot valve 60 and the positioning relay 80 is more fully described in the previously referred to Patent No. 2,616,488 to Rudolph B. Werey. The control air which actuates the system is supplied through tube 66 from a conventional pneumatic control instrument 70 which is responsive to the value of a variable condition that is desired to be maintained at some constant value. Such an instrument has air supplied thereto, through tubing 67 under a regulated pressure and operates in a well-known manner to vary an output pressure in the tube 66.

*Operation, FIG. 2 Modification*

Since the valve 10 is shown in its closed position, it will be presumed, for purposes of explaining the operation of this novel system, that the controlled condition has dropped too low and that the valve must be opened to restore the condition to a higher desired set point. With a decreasing pressure signal to the instrument 70 less air pressure is transmitted to the pilot valve 60 which is operative in the manner set out in Patent No. 2,616,448, to shut the supply air entering from tube 90 into line 65 after having been filtered through filter 91 and reduced to a constant preselected level by reducing valve 92 as indicated on the gage 93. This operation serves to reduce the air pressure in line 65 which in turn causes a lack or variation of pressure in chamber 51. This reduction occur because of dissipation of air pressure through the openings 68 and 69, neither of which is air tight. With the decreased pressure in chamber 51, there is sufficient excess force in spring 56 to cause the piston 54 to move upward. The movement of this piston thus opens line 41, connecting it with the line 64 through the valve. At the same time line 42 is blocked from line 64 but open to atmosphere through vent 58. Thereafter air is free to flow from line 64 through line 41 to operate motor 40 in the direction which will drive gear pump 30 in its predetermined correct direction. For this illustrative case the desired direction is that which will pressurize hydraulic line 101. Under conditions requiring reverse action of piston 54 line 42 would be open to line 64 and line 41 would vent through 59.

With high pressure flow in line 101, line 100 will be under a negative pressure. Looking at the circuit (or network) it will be seen that pilot check valve 27 is open due to the flow in line 101 while pilot check valve 26 is open due to pilot pressure in line 38 which is taken off line 101. Pilot check valve 25 is closed due to checking action from line 31 and a zero pilot pressure from the sump through line 32. Pilot check valve 24 is open due to the pilot pressure in line 35 coming off line 101. With pilot check valve 24 open to the sump 104, any volume change in the liquid is taken up in the sump.

The basic circuit is thus from pump 30 through the line 101 to the lower cylinder chamber 20a. As the pressure forces piston 17 upwardly the excess liquid from chamber 20b is forced into line 100 from whence it returns either to pump 30 or through lines 34 and 36 to the sump 104.

Normally the amount by which piston 17, and with it stem 18 and extension 19, are raised is within the length of the cylinder 20. However, due to a sudden extreme change of condition the instrument 70 may call for more movement than cylinder 20 can provide. In this latter case, when piston 17 has reached the limit of its possible movement the pressure in line 101 will continue to build up, possibly continuing past a predetermined value which is set here for illustrative purposes at 4000 p.s.i. At this value the electric limit switch 21 will be actuated to trip the solenoid on valve 23 to its off position.

When this occurs air pressure entering the valve 23 through line 48 will be cut off and since valve 23 (and 22) is in essence a stop and waste valve, the line 46 will be vented to atmosphere. This will cause a drop in pressure to valve 44 which is a normally closed valve. Therefore the valve will close, shutting off the air supply through line 41 to the motor 40. The valve 44 (likewise 43) is similar to a stop and waste valve in that when it is closed the connecting line to the motor 40 is vented to atmosphere. Since this is a well-known standard valve action, the construction to facilitate the venting of the motor has not been shown. Although the above sequence of events is quite rapid there is a likelihood that due to inertia and expansion factors in the liquid a build up in pressure will continue for a short time. To prevent this build up from becoming excessive, the relief valve 29 is set to open at a reasonable value above that of the limit switch 21. For illustrative purposes, this figure is taken at 4400 p.s.i. With relief valve 29 open, the flow from line 101 will enter line 102 and return to the sump 104.

Most often, after a change in condition is called for, the desired final position of the valve stem will be somewhere intermediate the two ends of the cylinder. In the action described above as the valve stem 18 and extension 19 move upwardly the levers 81 and 82 will be moved in a clockwise direction by the pin 83 on the extension 19. This movement is imparted through slider 84 to lever 85 to permit expansion of spring 86. The end plate 87 of the chamber 88 is thus moved upwardly. This will open the air supply permitting increased air pressure into line 65 and thereby into chamber 51. Ideally, this increase should stop when the pressure in chamber 51 provides a balancing force to the force of spring 56 so that piston 54 is in its original neutral position. However, should the increase be more than is desired the instrument 70 will signal a decreased demand and the air supply through line 66 will be decreased which through primary control instrument 80 and pilot valve 60 will eventually cause a decrease in air pressure in line 65.

Eventually the pilot valve 60 will be adjusted to a position where the pressure in the chamber 88 is at a predetermined desired value and the piston valve 54 will be in a center position to obstruct both lines 41 and 42. With the system at neutral the cylinder is locked in position because of the checking action of pilot check valves 26 and 27. If, because of temperature conditions, the oil in the cylinder should expand so as to cause a build up in pressure within the system which exceeds the aforesaid value of 4400 p.s.i., the relief valves 28 and 29 will open to permit flow of the excess liquid back to the sump. To prevent any "lock-up" of the system because the pressure at limit switch 21 might actuate both valves 22 and 23 after a pressure buildup caused by a temperature increase, it is proposed to provide 21 with a slow bleeding by-pass which would take care of slow pressure build-ups due to temperature but would permit the switch 21 to actuate the proper valve under pressure buildups due to a sudden stoppage of piston 17. Such a by-pass has not been shown because it is a generally available standard item.

Another preventative approach to the possibility of "lock-up" would be to place the limit chamber 21 adjacent the pump 30 (e.g., between the pump and check valves 26 and 27) so that the relief valves 28 and 29 unload either side of the cylinder 20 ahead of the checks due to pressure relief. This arrangement is shown in FIG. 4.

To illustrate the similarity between FIGS. 2 and 4, the same components in each figure have been indicated by the same numerals. Those components in FIG. 4 which have been rearranged for purposes of illustration have been given the same number as corresponding components in FIG. 2 with the addition of a subscript "a." The operation of the apparatus which was described with reference to FIG. 2 is applicable to the FIG. 4 apparatus. The chief difference is in the construction of limit switch chamber 21a (FIG. 4). Unlike the chamber 21 shown in FIG. 2 the chamber 21a does not require a slow bleed by-pass. In the operation of the FIG. 4 apparatus as the gear pump of FIG. 4 drives the piston 17 to a stalled condition the electric limit switch in 21a shuts off the air motor 40. Check valves 26 and 27 immediately become operative to isolate the limit switch in 21a from continued pressure buildup in the cylinder. Thus once the motor is shut off only one line through the limit switch is subject to pressure. Any continued buildup of pressure due to temperature expansion does not act on both valves 22a and 23a but on only one. Therefore, there can be no "lock-up" of the system. The continued buildup, if any, in the cylinder is relieved through relief valves 28 and 29 because of the isolation by check valves 26 and 27.

Either arrangement for the placement of limit switches 21 or 21a is operable and acceptable.

Having now described a preferred embodiment of my invention it is to be understood that further modification thereof may be made within the scope of the appended claims.

I claim:
1. In a control system for a final control element, the combination comprising:
 (A) a hydraulically powered motor adapted to be joined to said final control element,
 (B) a hydraulic pump for supplying liquid under pressure to said motor,
 (C) means connecting said pump and said motor for transmitting liquid under pressure from said pump to said motor,
 (D) a second motor connected to said pump to drive said pump,
 (E) variably movable apparatus for controlling the application of power to said second motor,
 (F) continuously variable means for regulating said apparatus,
 (G) means operative in response to variations in the value of a condition for adjusting said regulating means, and
 (H) means adapted to be moved by said control element for readjusting said last mentioned means to neutralize changes imposed by said regulating means.

2. In a control system for a final control element, the combination comprising:
 (A) a hydraulically powered motor adapted to be joined to said final control element,
 (B) a hydraulic pump for supplying liquid under pressure to said motor,
 (C) means connecting said pump and said motor for transmitting liquid under pressure from said pump to said motor,
 (D) a second motor joined to said pump to drive said pump,
 (E) variably movable apparatus for controlling the application of power to said second motor,
 (F) means for discontinuing the application of power to said second motor when the first motor reaches a preselected position,
 (G) continuously variable means for regulating said apparatus,
 (H) means operative in response to variations in the value of a condition for adjusting said regulating means, and
 (I) means adapted to be moved by said control element for readjusting said last mentioned means to neutralize the changes imposed by said regulating means.

3. In a control system for a final control element, the combination comprising:
 (A) a hydraulically powered motor adapted to be joined to said final control element,
 (B) a hydraulic gear pump for supplying liquid under pressure to said motor,
 (C) hydraulic lines joining said pump and said motor for transmitting liquid under pressure from said pump,
 (D) a pneumatic motor joined to said pump to drive said pump,
 (E) variably movable apparatus for controlling the application of fluid to said pneumatic motor,
 (F) means for discontinuing the transmission of fluid to said pneumatic motor when the hydraulically powered motor reaches a preselected position,
 (G) continuously variable means for regulating said apparatus,
 (H) means operative in response to variations in the value of a condition for adjusting said regulating means, and
 (I) means adapted to be moved by said control element for readjusting said last mentioned means to neutralize the changes imposed by said regulating means.

4. A combination according to the recitation of claim 3 wherein (F) said discontinuing means includes:
 (A) an electric limit switch,
 (B) a valve mounted in a pneumatic line joining said apparatus and said pneumatic motor,
 (C) means connected between said switch and said valve for closing and opening said valve when said switch is actuated, whereby, when the hydraulically powered motor reaches a preselected position, the switch is actuated to shut said valve thus cutting off the flow of fluid to said pneumatic motor.

5. A combination according to the recitation of claim 3 wherein (F) said discontinuing means includes:
 (A) a hydraulic pressure actuated device connected to at least one of said hydraulic lines,
 (B) a valve mounted in a pneumatic line joining said variably movable apparatus and said pneumatic motor,
 (C) means connected between said device and said valve for closing and opening said valve when said device is actuated in response to pressure in said at least one hydraulic line, whereby, when the liquid pressure in said at least one hydraulic line reaches a preselected value, the device is actuated and transmits a closing action through said connecting means to shut said valve thus cutting off the flow of fluid to said pneumatic motor.

6. A combination according to the recitation of claim 5 wherein (A) said device contains a movable piston and an air bleeder jet nozzle controllable by said piston.

7. A combination according to the recitation of claim 5 wherein (A) said device is an electric pressure limit switch.

8. In a control system for a final control element having a motion substantially proportional to a controlled signal, the combination comprising:
 (A) a multi-directional hydraulic power device adapted to be joined to said final control element; said device including:
  (1) means therein adapted to be moved by liquid under pressure from one portion of said device to another portion, and
  (2) ports in said device for the admission of said liquid under pressure,
 (B) a reversible hydraulic pump having outlets for supplying liquid under pressure to said device,
 (C) a network of hydraulic lines joining said outlets to said ports, said network including:
  (1) check means for preventing backflow through preselected portions of said network, and
  (2) means for relieving the accumulation of excessive liquid pressure in said network,
 (D) a reversible motor connected to said pump to drive said pump,
 (E) variably movable apparatus for controlling the application of power to said motor,
 (F) continuously variable means for regulating said apparatus,
 (G) means operative in response to variations in the value of a condition for adjusting said regulating means and
 (H) means adapted to be moved by said control element for readjusting said last mentioned means to neutralize the changes imposed by said regulating means.

9. In a control system for a final control element having a motion substantially proportional to a controlled signal, the combination comprising:
 (A) a multi-directional hydraulic power device adapted to be joined to said final control element; said device including:
  (1) means therein adapted to be moved by liquid under pressure from one portion of said device to another portion, and
  (2) ports in said device for the admission of said liquid under pressure,
 (B) a reversible hydraulic pump having outlets for supplying liquid under pressure to said device,
 (C) a network of hydraulic lines joining said outlets to said ports,
 (D) a reversible motor connected to said pump to drive said pump,
 (E) variably movable apparatus for controlling the application of power to said motor,
 (F) continuously variable means for regulating said apparatus,
 (G) means operative in response to variations in the value of a condition for adjusting said regulating means,
 (H) means adapted to be moved by said control element for readjusting said last mentioned means to neutralize the changes imposed by said regulating means, and
 (I) means for cutting off the application of power to said motor when said control element is at a preselected position.

10. In a control system for a final control element having a motion substantially proportional to a controlled signal, the combination comprising:
 (A) a multi-directional hydraulic power device adapted to be joined to said final control element; said device including:
  (1) means therein adapted to be moved by liquid under pressure from one portion of said device to another portion, and
  (2) ports in said device for the admission of said liquid under pressure,
 (B) a reversible hydraulic gear pump having outlets for supplying liquid under pressure to said device,
 (C) a network of hydraulic lines joining said outlets to said ports, said network including:
  (1) check means for preventing backflow through preselected portions of said network, and
  (2) means for relieving the accumulation of excessive liquid pressure in said network,
 (D) a reversible motor connected to said pump to drive said pump,
 (E) variably movable apparatus for controlling the application of power to said motor,
 (F) means associated with said network for discontinuing the application of power to said motor when the liquid pressure in said network reaches a preselected value,
 (G) continuously variable means for regulating said apparatus,
 (H) means operative in response to variations in the value of a condition for adjusting said regulating means, and
 (I) means adapted to be moved by said control element for readjusting said last mentioned means to neutralize the changes imposed by said regulating means.

11. In a control system for a final control element having a substantially linear movement, the combination comprising:
 (A) a hydraulic power cylinder adapted to be joined to said final control element; said cylinder including:
  (1) a rod and piston therein adapted to be moved by liquid under pressure from one end of said cylinder to the other end, and
  (2) a port at each end of said cylinder for the admission of said liquid under pressure,
 (B) a reversible hydraulic gear pump having outlets for supplying liquid under pressure to said cylinder,
 (C) a network of hydraulic lines joining said outlets to said ports, said network including:
  (1) check means for preventing backflow through preselected portions of said network, and
  (2) means for relieving the accumulation of excessive liquid pressure in said network,
 (D) a reversible pneumatic motor connected to said pump to drive said pump,
 (E) apparatus for controlling the flow of fluid under pressure to said motor,
 (F) means associated with said network for discontinuing the flow of fluid to said motor when the liquid pressure in said network reaches a preselected value,
 (G) continuously variable means for regulating said apparatus,
 (H) means operative in response to variations in the value of a condition for adjusting said regulating means, and
 (I) means adapted to be moved by said control element for readjusting the said last mentioned means to neutralize the changes imposed by said regulating means.

12. A combination according to the recitation of claim 11, wherein (F) said means associated with said network includes:

(A) an electric pressure limit switch connected to said network,
(B) a pressure actuated pneumatic valve mounted in a pneumatic line joining said apparatus and said motor,
(C) a solenoid actuated valve connected to said pressure limit switch and a source of power and joining a pneumatic pressure source with said pressure actuated pneumatic valve;

whereby, when the liquid in said network reaches a preselected pressure value, the electric pressure limit switch is tripped to cut off the flow of electric power to said solenoid actuated valve and thus closing it and preventing the transmission of pneumatic pressure to said pneumatic valve, the latter thereby being closed to prevent the flow of fluid to said motor.

13. A combination according to the recitation of claim 11, wherein (F) said means associated with said network includes:
(A) a hydraulic pressure actuated device connected to said network,
    (1) said device having a movable piston therein restrained against movement to a preselected pressure value,
(B) a pressure actuated pneumatic valve mounted in a pneumatic line joining said apparatus and said motor,
(C) an air bleeder line connected between said device and said valve,
    (1) said line having a valve jet adjacent said piston,
    whereby, when the liquid in said network reaches a preselected pressure value, said piston moves to shut off air escaping through said valve jet and eliminate air bleed from said bleeder line, thus increasing the pneumatic pressure in said valve which forces said valve shut and closes said pneumatic line between said apparatus and said regulating means, thereby preventing the flow of fluid to said motor.

14. In a control system for a final control element having a substantially linear movement, the combination comprising:
(A) a hydraulic power cylinder adapted to be joined to said final control element; said cylinder including:
    (1) a rod piston therein adapted to be moved by liquid under pressure from one end of said cylinder to the other end, and
    (2) a port at each end of said cylinder for the admission of said liquid under pressure,
(B) a reversible hydraulic gear pump having outlets for supplying liquid under pressure to said cylinder,
(C) a network of hydraulic lines joining said outlets to said ports, said network including:
    (1) check means for preventing backflow through preselected portions of said network, and
    (2) means for relieving the accumulation of excessive liquid pressure in said network,
(D) a reversible pneumatic motor connected to said pump to drive said pump,
(E) pressure operated means for controlling the application of fluid under pressure to said motor, said means including:
    (1) a piston,
    (2) a resilient member to bias said piston in one direction to move said piston from a neutral position and thereby apply fluid to drive said motor in one direction,
    (3) a part subject to fluid pressure to move said piston in the direction opposite to that imposed by said resilient member and thereby apply fluid to drive said motor in the opposite direction,
(F) a pilot valve operative to apply a pressure to said part in opposition to said bias,
(G) means operative in response to variations in the value of a condition for adjusting said pilot valve,
(H) means adapted to be moved by said control element for readjusting said last mentioned means to neutralize the changes imposed by said pilot valve, and
(I) means for discontinuing the flow of fluid to said motor when said piston is at a preselected position.

15. A combination according to the recitation of claim 14 wherein, (I) said discontinuing means includes:
(A) a hydraulic pressure actuated device connected to said network,
(B) a valve mounted in a pneumatic line joining said pressure operated means and said motor,
(C) means connected between said device and said valve for closing and opening said valve when said device is actuated in response to pressure in said network,
    whereby, when the liquid pressure in said network reaches a preselected value the device is actuated and transmits a closing action through said connecting means to shut said valve thus cutting off the flow of fluid to said motor.

16. A combination according to the recitation of claim 15 wherein (A) said device contains a movable piston and an air bleeder jet nozzle controllable by said piston, and (C) said connecting means is an air bleeder line.

17. A combination according to the recitation of claim 15 wherein (A) said device is an electric pressure limit switch, and (C) said connecting means is a solenoid actuated air valve connected to said switch and in an air pressure line between (B) said valve and an air supply line.

18. In a control system for a final control element having a substantially linear movement, the combination comprising:
(A) a hydraulic power cylinder adapted to be joined to said final control element; said cylinder including:
    (1) a rod and piston therein adapted to be moved by liquid under pressure from one end of said cylinder to the other end, and
    (2) a port at each end of said cylinder for the admission of said liquid under pressure,
(B) a reversible hydraulic gear pump having outlets for supplying liquid under pressure to said cylinder,
(C) a network of hydraulic lines joining said outlets to said ports, said network including:
    (1) check means for preventing backflow through preselected portions of said network, and
    (2) means for relieving the accumulation of excessive liquid pressure in said network,
(D) a reversible pneumatic motor connected to said pump to drive said pump,
(E) pressure operated means for controlling the application of fluid under pressure to said motor, said means including:
    (1) a part having a mid-position and movable in opposite directions from said mid-position to control a supply of fluid to said motor,
    (2) pressure responsive means connected to said part for moving the same,
    (3) means to bias said pressure responsive means in one direction,
(F) a pilot valve operative to apply a pressure to said pressure responsive means to bias the same in the opposite direction,
(G) means operative in response to variations in the value of a condition for adjusting said pilot valve,
(H) means adapted to be moved by said control element for readjusting said last mentioned means to neutralize the changes imposed by said valve, and
(I) means for discontinuing the flow of fluid to said motor when said piston is at an end of its stroke, said means including:
- (1) an electric pressure limit switch connected to said network,
- (2) an electric solenoid actuated air valve connected to said limit switch, said valve joining a fluid pressure source with
- (3) a fluid pressure actuated pneumatic valve in a fluid carrying line joining said motor with said pressure operated means, whereby, when said piston reaches an end of its stroke, the continuing pressure build-up in said cylinder and network actuates said limit switch to close said solenoid valve which in turn closes said pressure actuated pneumatic valve thus cutting off the flow of fluid to said motor.

19. In a control system for a final control element having a substantially linear movement, the combination comprising:
- (A) a hydraulic power cylinder adapted to be joined to said final control element; said cylinder including:
  - (1) a rod and piston therein adapted to be moved by liquid under pressure from one end of said cylinder to the other end, and
  - (2) a port at each end of said cylinder for the admission of said liquid under pressure,
- (B) a reversible hydraulic gear pump having outlets for supplying liquid under pressure to said cylinder,
- (C) a network of hydraulic lines joining said outlets to said ports, said network including:
  - (1) check means for preventing backflow through preselected portions of said network,
  - (2) means for relieving the accumulation of excessive liquid pressure in said network, and
  - (3) means for varying the flow of said liquid through said network whereby the speed of travel of said piston may be controlled,
- (D) a reversible pneumatic motor connected to said pump to drive said pump,
- (E) pressure operated means for controlling the application of fluid under pressure to said motor, said means including:
  - (1) a part having a mid-position and movable in opposite directions from said mid-position to control a supply of fluid to said motor,
  - (2) pressure responsive means connected to said part for moving the same,
  - (3) means to bias said pressure responsive means in one direction,
- (F) a pilot valve operative to apply a pressure to said pressure responsive means to bias the same in the opposite direction,
- (G) means operative in response to variations in the value of a condition for adjusting said pilot valve,
- (H) means adapted to be moved by said control element for readjusting said last mentioned means to neutralize the changes imposed by said pilot valve, and
- (I) means for discontinuing the flow of fluid to said motor when said piston is at an end of its strike, said means including:
  - (1) an electric pressure limit switch connected to said network,
  - (2) an electric solenoid actuated air valve connected to said limit switch, said valve joining a fluid pressure source with
  - (3) a fluid pressure actuated pneumatic valve in a fluid carrying line joining said motor with said pressure operated means, whereby, when said piston reaches an end of its stroke, the continuing pressure build-up in said cylinder and network actuates said limit switch to close said solenoid valve which in turn closes said pressure actuated pneumatic valve thus cutting off the flow of fluid to said motor.

References Cited in the file of this patent
UNITED STATES PATENTS

| | | |
|---|---|---|
| 2,582,556 | Morey | Jan. 15, 1952 |
| 2,602,294 | Sedgwick | July 8, 1952 |
| 2,616,448 | Werey | Nov. 4, 1952 |
| 2,938,347 | Sturgis | May 31, 1960 |
| 2,942,581 | Gaffney | June 28, 1960 |

UNITED STATES PATENT OFFICE
CERTIFICATE OF CORRECTION

Patent No. 3,157,994                            November 24, 1964

Warren H. Brand

It is hereby certified that error appears in the above numbered patent requiring correction and that the said Letters Patent should read as corrected below.

Column 9, line 41, after "means" insert a comma; column 11, line 48, after "rod" insert -- and --; column 12, line 74, after "said" insert -- pilot --; column 14, line 18, for "strike" read -- stroke --.

Signed and sealed this 13th day of April 1965.

(SEAL)
Attest:

ERNEST W. SWIDER                                     EDWARD J. BRENNER
Attesting Officer                                         Commissioner of Patents